United States Patent
Yabe et al.

(10) Patent No.: US 12,043,932 B2
(45) Date of Patent: Jul. 23, 2024

(54) NONWOVEN FABRIC AND METHOD FOR MANUFACTURING SAME

(71) Applicant: IDEMITSU KOSAN CO., LTD., Chiyoda-ku (JP)

(72) Inventors: Mari Yabe, Sodegaura (JP); Takumi Sugiuchi, Chiba (JP); Masaki Okano, Chiba (JP); Yutaka Minami, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 448 days.

(21) Appl. No.: 17/290,926

(22) PCT Filed: Nov. 6, 2019

(86) PCT No.: PCT/JP2019/043500
§ 371 (c)(1),
(2) Date: May 3, 2021

(87) PCT Pub. No.: WO2020/095948
PCT Pub. Date: May 14, 2020

(65) Prior Publication Data
US 2021/0404099 A1 Dec. 30, 2021

(30) Foreign Application Priority Data

Nov. 9, 2018 (JP) ................................. 2018-211714

(51) Int. Cl.
| | | |
|---|---|---|
| *D04H 3/147* | (2012.01) | |
| *C08L 23/04* | (2006.01) | |
| *C08L 23/12* | (2006.01) | |
| *D01F 8/06* | (2006.01) | |
| *D04H 3/007* | (2012.01) | |
| *D04H 3/018* | (2012.01) | |

(52) U.S. Cl.
CPC ............. *D04H 3/147* (2013.01); *C08L 23/04* (2013.01); *C08L 23/12* (2013.01); *D01F 8/06* (2013.01); *D04H 3/007* (2013.01); *D04H 3/018* (2013.01); C08L 2203/12 (2013.01); D10B 2321/021 (2013.01); D10B 2321/022 (2013.01)

(58) Field of Classification Search
CPC ........ D04H 3/147; D04H 3/018; D04H 3/007; D04H 3/016; D01F 8/06; C09L 23/12; C09L 23/04; C08L 2203/12; C08L 23/10; D10D 2321/022; D10D 2321/021; D02G 1/18
USPC ........................................................ 428/353
See application file for complete search history.

(56) References Cited

U.S. PATENT DOCUMENTS

| | | |
|---|---|---|
| 2004/0067709 A1 | 4/2004 | Kishine et al. |
| 2007/0021022 A1 | 1/2007 | Kishine et al. |
| 2010/0028654 A1 | 2/2010 | Takase et al. |
| 2011/0178229 A1 | 7/2011 | Goda et al. |
| 2013/0011744 A1 | 1/2013 | Takata et al. |
| 2017/0145198 A1 | 5/2017 | Koori et al. |
| 2018/0209080 A1 | 7/2018 | Koori et al. |
| 2018/0213852 A1 | 8/2018 | Matsubara et al. |

FOREIGN PATENT DOCUMENTS

| | | | |
|---|---|---|---|
| CN | 101035677 A | 9/2007 | |
| CN | 102164989 A | 8/2011 | |
| CN | 102811848 A | 12/2012 | |
| CN | 106062261 A | 10/2016 | |
| CN | 106661792 A | 5/2017 | |
| CN | 107835876 A | 3/2018 | |
| EP | 3121314 A1 * | 1/2017 | ............. B32B 5/022 |
| JP | 2003-301360 A | 10/2003 | |
| JP | 2017-222971 A | 12/2017 | |
| JP | 2018-159158 A | 10/2018 | |
| WO | WO 2014/119687 A1 | 8/2014 | |
| WO | WO 2017/006972 A1 | 1/2017 | |

OTHER PUBLICATIONS

Extended European Search Report issued Mar. 27, 2023 in European Patent Application No. 19882673.7, 9 pages.
Combined Chinese Office Action and Search Report issued Jul. 27, 2022, in corresponding Chinese Patent Application No. 201980072906.5 (with English Translation of Category of Cited Documents) 9 pages.
Japanese Notice of Reasons for Refusal issued Jun. 6, 2023 in Japanese Application No. 2020-555546 (with unedited computer generated English translation) 5 pages.
International Search Report issued on Dec. 10, 2019 in PCT/JP2019/043500 filed on Nov. 6, 2019, 2 pages.
"Nonwoven fabric basics and applications," The Textile Machinery Society of Japan, 1993, pp. 142-147, 3 total pages.
Official communication issued Nov. 13, 2023, (Client received Jan. 21, 2024) in corresponding Brazilian Patent Application No. BR112021008163-1 (with English Translation), 8 pages.

\* cited by examiner

*Primary Examiner* — Camie S Thompson
(74) *Attorney, Agent, or Firm* — Oblon, McClelland, Maier & Neustadt, L.L.P.

(57) ABSTRACT

The present invention relates to a nonwoven fabric including a conjugated fiber containing 40% by mass or more and 80% by mass or less of a propylene homopolymer (A) having a melting point (Tm-D) measured by a differential scanning calorimeter (DSC) of higher than 120° C., 4% by mass or more and 40% by mass or less of a polypropylene-based resin (B) having a melting point (Tm-D) measured by a differential scanning calorimeter (DSC) of 120° C. or lower, and 10% by mass or more and 55% by mass or less of a polyethylene-based resin (C), wherein the nonwoven fabric has a texture uniformity of 2.1 or more and 3.0 or less and a bulkiness of 450 μm or more.

15 Claims, No Drawings

NONWOVEN FABRIC AND METHOD FOR MANUFACTURING SAME

TECHNICAL FIELD

The present invention relates to a nonwoven fabric and a method for producing the same.

BACKGROUND ART

In recent years, resins for fibers have been required to have high spinnability capable of withstanding various spinning conditions such as expansion of a spinnable temperature range. For example, PTL 1 discloses a nonwoven fabric composed of a resin composition containing a high-crystalline polyolefin and a low-crystalline polyolefin, the nonwoven fabric satisfying specified conditions, for the purpose of reducing the fiber diameter of fibers constituting the nonwoven fabric while preserving spinning stability.

CITATION LIST

Patent Literature

PTL 1: WO 2014/119687 A

SUMMARY OF INVENTION

Technical Problem

In recent years, there has been an increasing demand for softness and smoothness of touch, and there has been a demand for a nonwoven fabric that simultaneously satisfies bulkiness and texture uniformity. However, in the technique disclosed in PTL 1, although it is possible to satisfy the requirement for the texture uniformity by realizing the reducing of the fiber diameter of fibers, it is not possible to obtain a nonwoven fabric that sufficiently satisfies the requirement for the bulkiness in some cases.

A problem to be solved by the present invention is to provide a nonwoven fabric which is excellent in texture uniformity and has sufficient bulkiness.

Solution to Problem

Specifically, the disclosures of the present application are concerned with the following.

<1> A nonwoven fabric including a conjugated fiber containing 40% by mass or more and 80% by mass or less of a propylene homopolymer (A) having a melting point (Tm-D) measured by a differential scanning calorimeter (DSC) of higher than 120° C., 4% by mass or more and 40% by mass or less of a polypropylene-based resin (B) having a melting point (Tm-D) measured by a differential scanning calorimeter (DSC) of 120° C. or lower, and 10% by mass or more and 55% by mass or less of a polyethylene-based resin (C), wherein the nonwoven fabric has a texture uniformity of 2.1 or more and 3.0 or less and a bulkiness of 450 μm or more.

<2> The nonwoven fabric as set forth in the above <1>, wherein the number of pills is 30 or less per 210 mm×297 mm.

<3> The nonwoven fabric as set forth in the above <1> or <2>, wherein the conjugated fiber is a crimped fiber.

<4> The nonwoven fabric as set forth in any one of the above <1> to <3>, wherein the conjugated fiber is at least one selected from the group consisting of a side-by-side type fiber and a core-sheath type fiber.

<5> The nonwoven fabric as set forth in any one of the above <1> to <4>, wherein only one component of the conjugated fiber contains the polypropylene-based resin (B), and only the other component contains the polyethylene-based resin (C).

<6> The nonwoven fabric as set forth in any one of the above <1> to <5>, wherein the conjugated fiber has a fineness of 1.8 denier or less.

<7> The nonwoven fabric as set forth in any one of the above <1> to <6>, wherein the propylene homopolymer (A) has a melt flow rate (MFR) at 230° C. of 5 g/10 min or more and 100 g/10 min or less.

<8> The nonwoven fabric as set forth in any one of the above <1> to <7>, wherein the polypropylene-based resin (B) has a melt flow rate (MFR) at 230° C. of 5 g/10 min or more and 5,000 g/10 min or less.

<9> The nonwoven fabric as set forth in any one of the above <1> to <8>, wherein the polypropylene-based resin (B) has a melting endotherm (ΔH-D) measured by a differential scanning calorimeter (DSC) of 0 J/g or more and 80 J/g or less.

<10> The nonwoven fabric as set forth in any one of the above <1> to <9>, wherein the polypropylene-based resin (B) has a molecular weight distribution (Mw/Mn) of 1.5 or more and 3.5 or less.

<11> The nonwoven fabric as set forth in any one of the above <1> to <10>, wherein the polypropylene-based resin (B) is a propylene homopolymer.

<12> The nonwoven fabric as set forth in any one of the above <1> to <11>, wherein the polyethylene-based resin (C) has a melting point (Tm-D) measured by a differential scanning calorimeter (DSC) of 140° C. or lower.

<13> The nonwoven fabric as set forth in any one of the above <1> to <12>, wherein the polyethylene-based resin (C) has a melt flow rate (MFR) at 190° C. of 10 g/10 min or more and 50 g/10 min or less.

<14> A method for producing a nonwoven fabric, including a step of melt-bonding a conjugated fiber by hot air, the conjugated fiber containing 40% by mass or more and 80% by mass or less of a propylene homopolymer (A) having a melting point (Tm-D) measured by a differential scanning calorimeter (DSC) of higher than 120° C., 4% by mass or more and 40% by mass or less of a polypropylene-based resin (B) having a melting point (Tm-D) measured by a differential scanning calorimeter (DSC) of 120° C. or lower, and 10% by mass or more and 55% by mass or less of a polyethylene-based resin (C).

<15> The method for producing a nonwoven fabric as set forth in the above <14>, wherein the step of melt-bonding the conjugated fiber by hot air includes a step of heating the conjugated fiber at 100 to 140° C. using a hot air oven to melt-bond the conjugated fibers to each other.

<16> The method for producing a nonwoven fabric as set forth in the above <14> or <15>, wherein the step of melt-bonding the conjugated fiber by hot air includes the steps of;

(i) applying hot air of 120 to 150° C. at a wind pressure of 1,000 to 2,500 Pa to the conjugated fiber using a hot air knife; and (ii) heating the conjugated fiber at 100 to 140° C. using a hot air oven to melt-bond the conjugated fibers to each other in this order.

Advantageous Effects of Invention

According to the present invention, it is possible to provide a nonwoven fabric which is excellent in texture uniformity and has sufficient bulkiness.

DESCRIPTION OF EMBODIMENTS

The present invention is hereunder described in detail. In this specification, the terminology "A to B" regarding the description of a numerical value means "A or more and B or less" (in the case of A<B), or "A or less and B or more" (in the case of A>B). In addition, in the present invention, a combination of preferred embodiments is more preferred embodiment.

[Nonwoven Fabric]

The nonwoven fabric of the present embodiment is a nonwoven fabric including a conjugated fiber containing 40% by mass or more and 80% by mass or less of a propylene homopolymer (A) having a melting point (Tm-D) measured by a differential scanning calorimeter (DSC) of higher than 120° C., 4% by mass or more and 40% by mass or less of a polypropylene-based resin (B) having a melting point (Tm-D) measured by a differential scanning calorimeter (DSC) of 120° C. or lower, and 10% by mass or more and 55% by mass or less of a polyethylene-based resin (C), wherein the nonwoven fabric has a texture uniformity of 2.1 or more and 3.0 or less and a bulkiness of 450 µm or more.

(Propylene Homopolymer (A))

The propylene homopolymer (A) has a melting point (Tm-D) of higher than 120° C. When the melting point (Tm-D) is 120° C. or lower, there is a concern that the strength of the fiber is insufficient. From such a viewpoint, the melting point (Tm-D) of the propylene homopolymer (A) is preferably 125° C. or higher, more preferably 130° C. or higher, and still more preferably 135° C. or higher. In addition, though an upper limit thereof is not particularly limited, it is preferably 180° C. or lower.

The melting point (Tm-D) of the propylene homopolymer (A) is defined as a peak top of a peak observed on the highest temperature side of a melting endothermic curve obtained by holding under a nitrogen atmosphere at −10° C. for 5 minutes and then increasing the temperature at a rate of 10° C./min by using a differential scanning calorimeter (DSC).

A melt flow rate (MFR) of the propylene homopolymer (A) is preferably 5 g/10 min or more, more preferably 7 g/10 min or more, sill more preferably 10 g/10 min or more, and especially preferably 20 g/10 min or more, and it is preferably 100 g/10 min or less, more preferably 75 g/10 min or less, and still more preferably 50 g/10 min or less. When the MFR is 5 g/10 min or more, the spinnability becomes more favorable, whereas when it is 100 g/10 min or less, the strength of the fiber can be more improved.

The melt flow rate (MFR) of the propylene homopolymer (A) is measured by the measurement method prescribed in JIS K7210, and it is measured under the conditions of a temperature of 230° C. and a load of 2.16 kg.

The semi-crystallization time of the propylene homopolymer (A) at 25° C. is preferably more than 0.01 seconds, more preferably 0.02 seconds or more, still more preferably 0.03 seconds or more, even more preferably 0.04 seconds or more, and preferably 0.06 seconds or less, more preferably 0.05 seconds or less. When the semi-crystallization time of the propylene homopolymer (A) at 25° C. is more than 0.01 seconds, a difference from the semi-crystallization time of the polypropylene resin (B) at 25° C. occurs, and the crimpability of the conjugated fiber can be enhanced.

In the present embodiment, the semi-crystallization time was measured by the following method.

Using FLASH DSC (manufactured by Mettler-Toledo, Inc.), the sample was heated at 230° C. for 2 minutes to be melted, then cooled to 25° C. at 2,000° C./sec, and a change in calorific value with time in an isothermal crystallization process at 25° C. was measured. When the integrated value of the calorific value from the start of isothermal crystallization to the completion of crystallization was taken as 100%, the time from the start of isothermal crystallization to the time when the integrated value of the calorific value reached 50% was taken as the semi-crystallization time.

As for commercially available products of the propylene homopolymer (A), "NOVATEC™ PP" series (for example, "NOVATEC SA03") (manufactured by Japan Polypropylene Corporation), "ExxonMobil™ polypropylene" series (for example, "PP3155") (manufactured by ExxonMobil Chemical Corporation), "Prime Polypro™" series (for example, "Y2000GP") (manufactured by Prime Polymer Co., Ltd.), "HG475FB" (manufactured by Borealis AG), and the like can be used (all are trade names).

The content of the propylene homopolymer (A) in the conjugated fiber is 40% by mass or more, preferably 42% by mass or more, and more preferably 45% by mass or more, and it is 80% by mass or less, preferably 70% by mass or less, and more preferably 60% by mass or less, from the viewpoint of spinnability of the fiber.

(Polypropylene-Based Resin (B))

The melting point (Tm-D) of the polypropylene-based resin (B) is 120° C. or lower, preferably 100° C. or lower, and more preferably 90° C. or lower, and it is preferably 0° C. or higher, more preferably 30° C. or higher, and still more preferably 60° C. or higher, from the viewpoint of enhancing the spinnability and crimpability of the fiber.

The melting point (Tm-D) of the polypropylene-based resin (B) is measured in the same manner as the melting point (Tm-D) of the propylene homopolymer (A).

In the polypropylene-based resin (B), a melting endotherm (ΔH-D) obtained from a melting endothermic curve obtained by holding a sample under a nitrogen atmosphere at −10° C. for 5 minutes and then increasing the temperature at a rate of 10° C./min by using a differential scanning calorimeter (DSC) is preferably 0 J/g or more and 80 J/g or less. Within this range, the spinnability of the fiber can be enhanced. From such a viewpoint, the melting endotherm (ΔH-D) is preferably 20 J/g or more, more preferably 25 J/g or more, still more preferably 27 J/g or more, and especially preferably 30 J/g or more, and it is preferably 50 J/g or less, more preferably 45 J/g or less, and still more preferably 40 J/g or less. When the melting endotherm is 20 J/g or more, stickiness is more suppressed.

The melting endotherm (ΔH-D) is calculated in a manner in which when a line connecting a point on the low-temperature side free from a change of the amount of heat with a point on the high-temperature side free from a change of the amount of heat is defined as a baseline, an area surrounded by a line portion including the peak observed on the highest temperature side of the melting endothermic curve obtained by the DSC measurement and the baseline is determined.

The melting endotherm (ΔH-D) can be controlled by appropriately adjusting the monomer concentration or the reaction pressure.

A melt flow rate (MFR) of the polypropylene-based resin (B) is preferably 5 g/10 min or more, more preferably 30 g/10 min or more, sill more preferably 100 g/10 min or more, and especially preferably 1,000 g/10 min or more, and it is preferably 5,000 g/10 min or less, more preferably 4,000 g/10 min or less, and still more preferably 3,000 g/10 min or less, from the viewpoint of enhancing the spinnability and crimpability of the fiber. When the MFR is 5 g/10 min or more, the spinnability becomes more favorable, whereas when it is 5,000 g/10 min or less, the strength of the fiber can be more improved.

The melt flow rate (MFR) of the polypropylene-based resin (B) is measured by the measurement method prescribed in JIS K7210, and it is measured under the conditions of a temperature of 230° C. and a load of 2.16 kg.

From the viewpoint of enhancing the spinnability and crimp ability of the fiber, a weight average molecular weight (Mw) of the polypropylene-based resin (B) is preferably 30,000 or more, more preferably 35,000 or more, and still more preferably 40,000 or more, and it is preferably 200,000 or less, and more preferably 150,000 or less.

A molecular weight distribution (Mw/Mn) of the polypropylene-based resin (B) is preferably 1.5 or more, and more preferably 1.8 or more, and it is preferably 3.5 or less, more preferably 3.0 or less, and still more preferably 2.5 or less. When the molecular weight distribution of the polypropylene-based resin (B) is within this range, the generation of stickiness in the fiber obtained by spinning is suppressed.

The weight average molecular weight (Mw) and the molecular weight distribution (Mw/Mn) are determined by means of a gel permeation chromatography (GPC) measurement. The weight average molecular weight is a weight average molecular weight expressed in terms of polystyrene, as measured by using the following device under the following condition, and the molecular weight distribution is a value calculated from a number average molecular weight (Mn) as measured similarly and the aforementioned weight average molecular weight.

<GPC Measuring Device>
Column: "TOSO GMHHR-H(S)HT", manufactured by Tosoh Corporation
Detector: RI detector for liquid chromatogram, "WATERS 150 C", manufactured by Waters Corporation
<Measurement Condition>
Solvent: 1,2,4-Trichlorobezene
Measurement temperature: 145° C.
Flow rate: 1.0 mL/min
Sample concentration: 2.2 mg/mL
Injection amount: 160 μL
Calibration curve: Universal Calibration
Analysis program: HT-GPC (Ver. 1.0)

The polypropylene-based resin (B) is not particularly limited so long as the aforementioned melting point (Tm-D) falls within the aforementioned range, and it may be a propylene homopolymer or may be a copolymer. Above all, a propylene homopolymer is preferred.

In the case where the polypropylene-based resin (B) is a copolymer, a copolymerization ratio of a propylene unit is more than 50 mol %, preferably 60 mol % or more, more preferably 70 mol % or more, still more preferably 90 mol % or more, and even more preferably 95 mol % or more. A copolymerizable monomer is at least one selected from the group consisting of ethylene and an α-olefin having 4 to 30 carbon atoms, and specifically, examples thereof include ethylene, 1-butene, 1-pentene, 1-hexene, 1-octene, and 1-decene. In the case where the polypropylene-based resin (B) is a copolymer, it is preferred that the polypropylene-based resin (B) contains at least one structural unit selected from the group consisting of ethylene and an α-olefin having 4 to 30 carbon atoms in an amount of more than 0 mol % and 20 mol % or less.

The semi-crystallization time of the polypropylene-based resin (B) at 25° C. is preferably more than 0.06 seconds. When the semi-crystallization time of the polypropylene-based resin (B) at 25° C. is more than 0.06 seconds, a difference from the semi-crystallization time of the propylene homopolymer (A) at 25° C. occurs, and the crimp ability of the conjugated fiber can be further enhanced.

The semi-crystallization time of the polypropylene-based resin (B) is measured in the same manner as the semi-crystallization time of the propylene homopolymer (A).

When the polypropylene-based resin (B) is a propylene homopolymer, a mesopentad fraction [mmmm] is preferably 20 mol % or more and 80 mol % or less from the viewpoint of the texture uniformity. When the mesopentad fraction [mmmm] is less than 20 mol %, the spinnability becomes unstable, and it becomes difficult to reduce the fiber diameter of fibers. On the other hand, when the mesopentad fraction [mmmm] is more than 80 mol %, the flexibility of the nonwoven fabric when processed into the nonwoven fabric is impaired. The mesopentad fraction [mmmm] is preferably 30 mol % or more, and more preferably 40 mol % or more. It is also preferably 60 mol % or less, and more preferably 55 mol % or less.

In the present invention, the mesopentad fraction [mmmm] is a meso fraction in a pentad unit in a polypropylene molecular chain measured by a signal of a methyl group in a $^{13}$C-NMR spectrum in accordance with a method proposed by A. Zambelli et al. in "Macromolecules, 6,925 (1973)". As the mesopentad fraction [mmmm] increases, the stereoregularity increases.

In addition, the $^{13}$C-NMR spectrum in the description herein was measured by the method described in Examples.
(Production Method of Polypropylene-Based Resin (B))

The polypropylene-based resin (B) is preferably produced using a metallocene catalyst in order to satisfy the aforementioned molecular weight distribution (Mw/Mn). For example, a metallocene-based catalyst as described in WO 2003/087172 A can be used. In particular, a metallocene-based catalyst using a transition metal compound in which a ligand forms a crosslinked structure via a crosslinking group is preferred. Above all, a metallocene-based catalyst obtained by combining a transition metal compound in which a crosslinked structure is formed via two crosslinking groups with a cocatalyst is preferred.

With regard to the polypropylene-based resin (B), specific examples of commercially available products of the propylene homopolymer include "S400", "S600", "S901" and the like of "L-MODU" (registered trademark) manufactured by Idemitsu Kosan Co., Ltd. Specific examples of commercially available products of the propylene-based copolymer include "Versify" manufactured by The Dow Chemical Company; "Vistamaxx" and "Linxar" manufactured by Exxon Mobil Corporation; "Licocene" manufactured by Clariant; and "Adflex" manufactured by LyondellBasell (all are trade names).

The content of the polypropylene-based resin (B) in the conjugated fiber is 4% by mass or more, preferably 6% by mass or more, and more preferably 8% by mass or more, and it is 40% by mass or less, preferably 30% by mass or less, and more preferably 20% by mass or less, from the viewpoint of enhancing the spinnability and crimp ability of the fiber.

(Polyethylene-Based Resin (C))

The polyethylene-based resin (C) is not particularly limited, but is preferably a polyethylene-based resin using a so-called metallocene catalyst having a narrow molecular weight distribution.

Further, the polyethylene-based resin may be an ethylene homopolymer or may be a copolymer. In the case of a copolymer, a copolymerization ratio of an ethylene unit is more than 50 mol %, preferably 60 mol % or more, more preferably 70 mol % or more, still more preferably 90 mol % or more, and yet still more preferably 95 mol % or more. The copolymerizable monomer is, for example, an α-olefin having 3 to 30 carbon atoms, and specific examples thereof include 1-butene, 1-pentene, 1-hexene, 1-octene, and 1-decene.

The semi-crystallization time of the polyethylene-based resin (C) is preferably 0.01 seconds or less from the viewpoint of enhancing the crimp ability of the conjugated fiber. When the semi-crystallization time of the polyethylene-based resin (C) at 25° C. is 0.01 seconds or less, a conjugated fiber having higher crimpability can be obtained.

A melt flow rate (MFR) of the polyethylene-based resin (C) is preferably 10 g/10 min or more, more preferably 15 g/10 min or more, and still more preferably 20 g/10 min or more, and it is preferably 50 g/10 min or less, more preferably 45 g/10 min or less, and still more preferably 40 g/10 min or less, from the viewpoint of enhancing the crimpability of the conjugated fiber.

The melt flow rate (MFR) of the polyethylene-based resin (C) is measured by the measurement method prescribed in JIS K7210, and it is measured under the conditions of a temperature of 190° C. and a load of 2.16 kg.

The melting point of the polyethylene-based resin (C) is preferably 90° C. or higher, more preferably 100° C. or higher, and still more preferably 115° C. or higher, and it is preferably 140° C. or lower, and more preferably 135° C. or lower, from the viewpoint of enhancing the crimpability of the conjugated fiber.

The melting point (Tm-D) of the polyethylene-based resin (C) is measured in the same manner as the melting point (Tm-D) of the propylene homopolymer (A).

With respect to the polyethylene-based resin (C), examples of commercially available products of the ethylene homopolymer include "ASPUN™" series (for example, "ASPUN 6850" and "ASPUN 6834") (manufactured by The Dow Chemical Company). In the case of an ethylene-based copolymer, examples of commercially available products of a copolymer of ethylene and octene include "AFFINITY GA1900", "AFFINITY GA1950", "AFFINITY EG8185", "AFFINITY EG8200", "ENGAGE 8137", "ENGAGE 8180", and "ENGAGE 8400" manufactured by The Dow Chemical Company (all are trade names).

The content of the polyethylene-based resin (C) in the conjugated fiber is 10% by mass or more, preferably 15% by mass or more, more preferably 20% by mass or more, and still more preferably 30% by mass or more, and it is 55% by mass or less, preferably 50% by mass or less, more preferably 48% by mass or less, and still more preferably 45% by mass or less, from the viewpoint of the crimpability of the fiber and the texture uniformity of the obtained nonwoven fabric.

The conjugated fiber constituting the nonwoven fabric of the present embodiment is preferably a crimped fiber. The configuration of the conjugated fiber is not particularly limited, and examples thereof include a side-by-side type fiber, a core-sheath type fiber, and an eccentric core-sheath type fiber. Among them, the side-by-side type fiber is preferable from the viewpoint of obtaining higher crimp ability.

In the description herein, the term "conjugated fiber" is used to include conjugate spun fibers formed by a side-by-side type nozzle, an eccentric core-sheath type nozzle, a deformed nozzle or a split nozzle in which different thermoplastic resins are combined and having two or more components. In addition, the core-sheath type fiber refers to a fiber whose cross section is composed of a "core" of an inner layer portion and a "sheath" of an outer layer portion, and the eccentric core-sheath type fiber refers to a fiber, which is the core-sheath type fiber, whose cross-sectional shape is such that the gravity center position of the inner layer portion is different from the gravity center position of the entire fiber.

Further, in the description herein, when the conjugated fiber is a side-by-side type fiber, one component constituting the side-by-side type fiber is referred to as a "first component" and the other component is referred to as a "second component". In the case of a core-sheath type fiber, one of the component used for the core portion and the component used for the sheath portion of the core-sheath type fiber is referred to as a "first component", and the other is referred to as a "second component".

When the conjugated fiber constituting the nonwoven fabric of the present embodiment is a side-by-side type fiber or a core-sheath type fiber, it is preferable that only one component (first component) of the fiber contains the polypropylene-based resin (B) and only the other component (second component) contains the polyethylene-based resin (C).

The content of the propylene homopolymer (A) in the first component is preferably 50% by mass or more, more preferably 60% by mass or more, and still more preferably 70% by mass or more, and it is preferably 99% by mass or less, more preferably 97% by mass or less, and still more preferably 95% by mass or less, based on 100% by mass of the first component.

The content of the polypropylene-based resin (B) in the first component is preferably 1% by mass or more, more preferably 3% by mass or more, and still more preferably 5% by mass or more, and it is preferably 50% by mass or less, more preferably 40% by mass or less, and still more preferably 30% by mass or less, based on 100% by mass of the first component.

The content of the polyethylene-based resin (C) in the second component is preferably 80% by mass or more, more preferably 85% by mass or more, and still more preferably 90% by mass or more, and the upper limit is 100% by mass, based on 100% by mass of the second component.

Furthermore, from the viewpoint of spinnability, the semi-crystallization time of the first component is preferably 1.2 to 2.0 times, more preferably 1.2 to 1.9 times, and still more preferably 1.3 to 1.9 times the semi-crystallization time of the propylene homopolymer (A) in the first component. When the respective semi-crystallization times satisfy the conditions in the above ranges, for example, even when the second component is composed only of the polyethylene-based resin (C), high spinnability can be maintained, and as a result, fibers having a small numerical value of fineness can be obtained.

The semi-crystallization time of the first component is measured in the same manner as the semi-crystallization time of the propylene homopolymer (A).

When the conjugated fiber constituting the nonwoven fabric of the present embodiment is a crimped fiber, the mass ratio (first component/second component) of the first component containing the propylene homopolymer (A) and the polypropylene-based resin (B) to the second component containing the polyethylene-based resin (C) is preferably 1/9 to 9/1, more preferably 3/7 to 7/3. When the mass ratio of the first component and the second component is within the above range, the nonwoven fabric exhibits crimpability and stretchability. However, in order to obtain the texture uniformity, it is required that the content of the polyethylene-based resin (C) in the conjugated fiber does not deviate from the range mentioned above.

The nonwoven fabric of the present embodiment may contain any additive within a range that does not inhibit the effects of the present invention. When the conjugated fiber constituting the nonwoven fabric of the present embodiment is at least one selected from the group consisting of a side-by-side type fiber, a core-sheath type fiber, and an eccentric core-sheath type fiber, at least one of the first component and the second component of the fiber may contain an additive.

Specific examples of the additive include a foaming agent, a crystal nucleating agent, a weatherability stabilizer, a UV absorber, a light stabilizer, a heat resistance stabilizer, an antistatic agent, a release agent, a flame retardant, a synthetic oil, a wax, an electric property-improving agent, a slip inhibitor, an anti-blocking agent, a viscosity-controlling agent, a coloring inhibitor, a defogging agent, a lubricant, a pigment, a dye, a plasticizer, a softening agent, an age resister, a hydrochloric acid-absorbing agent, a chlorine scavenger, an antioxidant, and an antitack agent.

The fineness (fiber diameter) of the fibers constituting the nonwoven fabric of the present embodiment is preferably 1.8 denier or less, more preferably 1.6 denier or less, and still more preferably 1.4 denier or less, from the viewpoint of hand touch feeling as the nonwoven fabric and the texture uniformity. Although a lower limit of the fineness is not particularly limited, from the viewpoint of easiness of production, it is preferably 0.5 denier or more, more preferably 0.6 denier or more, and still more preferably 0.7 denier or more.

The nonwoven fabric of the present embodiment may also be a multilayered nonwoven fabric including a laminate of two or more layers. In that case, from the viewpoint of smoothness of the surface, it is preferred that at least one layer of the nonwoven fabric constituting an outer layer of the multilayered nonwoven fabric is the nonwoven fabric including the aforementioned fiber.

A bulkiness of the nonwoven fabric of the present embodiment is 450 μm or more, preferably 500 μm or more, more preferably 550 μm or more, and still more preferably 600 μm or more, and the larger the value, the more preferable. In addition, the upper limit of the bulkiness is not particularly limited as long as the texture uniformity falls within the range of numerical values described later, but for example, it is preferably 1600 μm or less, more preferably 1400 μm or less, still more preferably 1200 μm or less, and even more preferably 1,000 μm or less.

In the present invention, the bulkiness of the nonwoven fabric was determined by stacking ten nonwoven fabric specimens each having a size of 50 mm in length and 50 mm in width, placing 1.9 g of a metal plate thereon, and measuring the thicknesses of the stacked specimens.

The nonwoven fabric of the present embodiment has a texture uniformity of 2.1 or more and 3.0 or less. Specifically, the texture uniformity is a value calculated by a method described in Examples described later. The texture uniformity is preferably 2.1 or more from the viewpoint of excellent design and excellent texture. In addition, when the texture uniformity is 3.0 or less, the nonwoven fabric has excellent design and excellent texture, and can be suitably used for sanitary materials such as disposable diapers.

In the nonwoven fabric of the present embodiment, the number of pills per 210 mm×297 mm is preferably 40 or less, and more preferably 30 or less. When the number of pills is within the above range, it is preferable in terms of texture uniformity and excellent texture. Further, it is also preferable from the viewpoint of prevention of accidental ingestion of the fallen pill fibers. The number of pills is measured by a method described in Examples described later.

<Production Method of Nonwoven Fabric>

The method for producing a nonwoven fabric of the present embodiment includes a step of melt-bonding a conjugated fiber by hot air, the conjugated fiber containing 40% by mass or more and 80% by mass or less of a propylene homopolymer (A) having a melting point (Tm-D) measured by a differential scanning calorimeter (DSC) of higher than 120° C., 4% by mass or more and 40% by mass or less of a polypropylene-based resin (B) having a melting point (Tm-D) measured by a differential scanning calorimeter (DSC) of 120° C. or lower, and 10% by mass or more and 55% by mass or less of a polyethylene-based resin (C). By melt-bonding the fibers with hot air, it is possible to obtain a sufficiently bulky nonwoven fabric having excellent texture uniformity.

Generally, in the spunbond method, a melt-extruded resin composition is spun, stretched, and then opened to form a continuous long fiber, and subsequently, in the continuing step, the continuous long fiber is deposited on a moving collector surface and entangled to produce a nonwoven fabric. According to the foregoing method, the nonwoven fabric can be continuously produced, and the fibers constituting the nonwoven fabric are a stretched continuous long fiber, and therefore, the strength is high. In the spunbond method, the fibers can be produced by extruding a molten polymer through a large nozzle having several thousands of holes or a group of small nozzles having about 40 holes. After being ejected from the nozzle, the molten fiber is cooled by a cross-flow cold air system and then drawn away from the nozzle, followed by stretching by high-speed airflow. Generally, there are two kinds of air-damping methods, both of which use a venturi effect. In the first method, a filament is stretched using a suction slot (slot stretching), and this method is conducted with a width of the nozzle or a width of the machine. In the second method, a filament is stretched through a nozzle or a suction gun. A filament formed by this method is collected on a screen (wire) or a pore forming belt to form a web.

In the method for producing a nonwoven fabric of the present embodiment, the step of melt-bonding the conjugated fiber by hot air preferably includes a step of heating the conjugated fiber at 100 to 140° C. using a hot air oven to melt-bond the conjugated fibers to each other. Here, the hot air oven is a device that covers a certain range of a conveyor and heats an object passing through the inside of the conveyor. In the step using a hot air oven, not only the conjugated fibers are melt-bonded to each other but also crimping of the conjugated fibers may occur.

In this case, from the viewpoint of not impairing the bulkiness of the nonwoven fabric, it is preferable that the conjugated fibers obtained as described above are collected on a moving net surface and then moved into the hot air oven using the conveyor, and the conjugated fibers are melt-bonded to each other by heating in the hot air oven. In the hot air oven, it is preferable that a plurality of ovens are continuously installed, and the heating temperature of each oven is preferably 100 to 140° C.

Usually, after the fibers are fused, a step in which the fiber bundle is passed between heating calender rolls, and for example, the fibers are bonded at a part where the embossing part on one roll includes about 10% or more and 40% or less of the area of the web to form a nonwoven fabric is performed. However, when the step of using a hot air oven is included in the production of the nonwoven fabric of the present embodiment, the step of passing the fiber bundle between heating calender rolls can be omitted.

In addition, in the method for producing a nonwoven fabric of the present embodiment, the step of melt-bonding the conjugated fiber by hot air may further include a step of applying hot air of 120 to 150° C. at a wind pressure of 1,000 to 2,500 Pa to the conjugated fiber using a hot air knife. Here, the hot air knife is a device that blows hot air from a slit having a constant width.

When a hot air oven and a hot air knife are used, the step of melt-bonding the conjugated fiber by hot air preferably includes the steps of:
 (i) applying hot air of 120 to 150° C. at a wind pressure of 1,000 to 2,500 Pa to the conjugated fiber using a hot air knife; and
 (ii) heating the conjugated fiber at 100 to 140° C. using a hot air oven to melt-bond the conjugated fibers to each other in this order.

At this time, from the viewpoint of not impairing the bulkiness of the nonwoven fabric, it is preferable that in the step (i), the conjugated fiber obtained as described above is subjected to hot air blown out from a hot air knife immediately after being collected on the moving net surface, and then in the step (ii), the conjugated fiber collected on the net surface and subjected to hot air using the hot air knife is moved into a hot air oven using a conveyor, and the conjugated fibers are melt-bonded to each other by heating in the hot air oven. The temperature of the hot air blown out from the hot air knife is preferably 120 to 150° C., and the pressure of the hot air (wind pressure) is preferably 1,000 to 2,500 Pa. In the hot air oven, it is preferable that a plurality of ovens are continuously installed, and the heating temperature of each oven is preferably 100 to 140° C.

In addition, when the step (i) and the step (ii) are performed, it is not necessary to pass the web obtained by collecting the fibers through a compression roll (compression roll).

The method for producing a nonwoven fabric of the present embodiment can also be applied to production of a nonwoven fabric composed of crimped fibers.

An example of a method for producing a side-by-side type crimped fiber is shown below. The side-by-side type crimped fiber is produced by a melt spinning method in which resins of at least two components are melt-extruded using separate extruders, respectively, extruded from special spinning nozzles as disclosed in, for example, U.S. Pat. No. 3,671,379, and the molten resins melt-extruded from the separate extruders are coalesced and discharged to form a fiber, which is then cooled and solidified. Here, in the above step, the higher the spinning speed, the higher the crimpability of the obtained side-by-side type crimped fiber, which is preferable.

In the method for producing a side-by-side type crimped fiber according to the present embodiment, a desired fiber can be produced without a post-treatment step such as heating or stretching after spinning, but a post-treatment step may be employed as necessary. For example, the crimping degree of the fiber may be increased by heating at 100 to 150° C., stretching 1.2 to 5 times, or a combination thereof.

[Fiber Product]

Although the fiber product using the nonwoven fabric of the present embodiment is not particularly limited, for example, the following fiber products can be exemplified. That is, examples thereof include a member for a disposable diaper, a stretchable member for a diaper cover, a stretchable member for a sanitary product, a stretchable member for a hygienic product, a stretchable tape, an adhesive bandage, a stretchable member for clothing, an insulating material for clothing, a heat insulating material for clothing, a protective suit, a hat, a mask, a glove, a supporter, a stretchable bandage, a base fabric for a fomentation, a non-slip base fabric, a vibration absorber, a finger cot, an air filter for a clean room, an electret filter subjected to electret processing, a separator, a heat insulator, a coffee bag, a food packaging material, a ceiling skin material for an automobile, an acoustic insulating material, a cushioning material, a speaker dust-proof material, an air cleaner material, an insulator skin, a backing material, an adhesive nonwoven fabric sheet, various members for automobiles, such as a door trim, various cleaning materials, such as a cleaning material for a copying machine, the facing and backing of a carpet, an agricultural beaming, a timber drain, members for shoes, such as a sport shoe skin, a member for a bag, an industrial sealing material, a wiping material, and a sheet.

EXAMPLES

Next, the present invention is specifically described by reference to Examples, but it should be construed that the present invention is by no means limited by these Examples.

[Semi-Crystallization Time]

The semi-crystallization time was measured by the following method using FLASH DSC (manufactured by Mettler-Toledo, Inc.).
 (1) The sample was heated at 230° C. for 2 minutes to be melted, then cooled to 25° C. at 2,000° C./sec, and a change in calorific value with time in an isothermal crystallization process at 25° C. was measured.
 (2) When the integrated value of the calorific value from the start of isothermal crystallization to the completion of crystallization was taken as 100%, the time from the start of isothermal crystallization to the time when the integrated value of the calorific value reached 50% was taken as the semi-crystallization time.

[Melt Flow Rate (MFR)]

In accordance with JIS K7210, measurement was performed under the conditions of a temperature of 230° C. and a load of 2.16 kg for the propylene homopolymer (A) and the polypropylene-based resin (B), and under the conditions of a temperature of 190° C. and a load of 2.16 kg for the polyethylene-based resin (C).

[DSC Measurement]

A melting endotherm ($\Delta$H-D) was determined from a melting endothermic curve obtained by holding 10 mg of a sample at −10° C. for 5 minutes under a nitrogen atmosphere and then increasing the temperature at a rate of 10° C./min by using a differential scanning calorimeter (DSC-7, manufactured by PerkinElmer Inc.). In addition, a melting point (Tm-D) was determined from a peak top of a peak observed on the highest temperature side of the obtained melting endothermic curve.

The melting endotherm ($\Delta$H-D) is calculated in a manner in which when a line connecting a point on the low-temperature side free from a change of the amount of heat with a point on the high-temperature side free from a change of the amount of heat is defined as a baseline, an area surrounded by a line portion including the peak of the melting endothermic curve obtained by the DSC measurement using a differential scanning calorimeter (DSC-7, manufactured by PerkinElmer Inc.) and the baseline is determined.

[Measurement of Weight Average Molecular Weight (Mw) and Molecular Weight Distribution (Mw/Mn)]

The weight average molecular weight (Mw) and the number average molecular weight (Mn) were measured by the gel permeation chromatography (GPC) method to obtain the molecular weight distribution (Mw/Mn). The following device and condition were used for the measurement to obtain a weight average molecular weight and a number average molecular weight as expressed in terms of polystyrene. The molecular weight distribution (Mw/Mn) is a value calculated from these weight average molecular weight (Mw) and number average molecular weight (Mn).

<GPC Measuring Device>

Column: "TOSO GMHHR-H(S)HT", manufactured by Tosoh Corporation

Detector: RI detector for liquid chromatogram, "WATERS 150 C", manufactured by Waters Corporation <Measurement Condition>

Solvent: 1,2,4-Trichlorobezene
Measurement temperature: 145° C.
Flow rate: 1.0 mL/min
Sample concentration: 2.2 mg/mL
Injection amount: 160 µL
Calibration curve: Universal Calibration
Analysis program: HT-GPC (Ver. 1.0)

[Measurement of $^{13}$C-NMR Spectrum]

The measurement of the $^{13}$C-NMR spectrum was carried out by the following apparatus under the following conditions according to the peak assignment proposed by A. Zambelli et al. in "Macromolecules, 8, 687 (1975)".

Apparatus: "JNM-EX400 type" 13C-NMR apparatus manufactured by JEOL Ltd.
Method: Proton complete decoupling method
Concentration: 220 mg/mL
Solvent: 90:10 (volume ratio) mixed solvent of 1,2,4-trichlorobenzene and heavy benzene
Temperature: 130° C.
Pulse width: 45°
Pulse repetition time: 4 seconds
Integration: 10,000 times $$M=m/S\times 100$$

$$R=\gamma/S\times 100$$

$$S=P\beta\beta+P\alpha\beta+P\alpha\gamma \qquad \text{<Calculation Formula>}$$

S: signal intensity of side chain methyl carbon atoms of all propylene units
Pββ: 19.8 to 22.5 ppm
Pαβ: 18.0 to 17.5 ppm
Pαγ: 17.5 to 17.1 ppm
γ: racemic pentad chain: 20.7 to 20.3 ppm
m: mesopentad chain: 21.7 to 22.5 ppm (Production of Propylene-Based Polymer (B1))

A stainless steel reaction vessel equipped with a stirrer and having an internal volume of 20 L was continuously fed with n-heptane at 20 L/hr, triisobutylaluminum at 15 mmol/hr, and a catalyst component obtained by previously contacting dimethylanilinium tetrakispentafluorophenylborate, (1,2'-dimethylsilylene) (2,1'-dimethylsilylene)-bis(3-trimethylsilylmethylindenyl)-zirconium dichloride, and triisobutylaluminum at a mass ratio of 1:2:20 with propylene at 6 µmol/hr in terms of zirconium.

Propylene and hydrogen were continuously fed at a polymerization temperature of 65° C. so as to maintain the hydrogen concentration in the vapor phase at 8 mol % and the total internal pressure of the reaction vessel at 1.0 MPa·G. An antioxidant was added to the obtained polymerization solution so that the content ratio thereof was 1000 ppm by mass, and then n-heptane as a solvent was removed to obtain a propylene-based polymer (B1).

The obtained propylene-based polymer (B1) was subjected to the above measurement. The results are shown in Table 1.

(Production of Propylene-Based Polymer (B2))

A stainless steel reaction vessel equipped with a stirrer and having an internal volume of 20 L was continuously fed with n-heptane at 20 L/hr, triisobutylaluminum at 15 mmol/hr, and a catalyst component obtained by previously contacting dimethylanilinium tetrakispentafluorophenylborate, (1,2'-dimethylsilylene) (2,1'-dimethylsilylene)-bis(3-trimethylsilylmethylindenyl)-zirconium dichloride, and triisobutylaluminum at a mass ratio of 1:2:20 with propylene at 6 µmol/hr in terms of zirconium.

Propylene and hydrogen were continuously fed at a polymerization temperature of 75° C. so as to maintain the hydrogen concentration in the vapor phase at 24 mol % and the total internal pressure of the reaction vessel at 1.0 MPa G. An antioxidant was added to the obtained polymerization solution so that the content ratio thereof was 1000 ppm by mass, and then n-heptane as a solvent was removed to obtain a propylene-based polymer (B2).

The obtained propylene-based polymer (B2) was subjected to the above measurement. The results are shown in Table 1.

TABLE 1

| | Unit | Propylene-based polymer (B1) | Propylene-basedpolymer (B2) |
|---|---|---|---|
| Semi-crystallization time | sec | 1 or more | 1 or more |
| MFR | g/10 min | 50 | 2,600 |
| Melting point (Tm-D) | ° C. | 80 | 80 |
| Melting endotherm (AH-D) | J/g | 37 | 36 |
| Weight average molecular weight (Mw) | — | 130,000 | 45,000 |
| Molecular weight distribution (Mw/Mn) | — | 2 | 2 |
| Mesopentad fraction (mmmm) | mol % | 51 | 47 |

In the following Examples, the following raw materials were used.

<Propylene Homopolymer (A)>

Propylene homopolymer (A1): "HG475FB" (manufactured by Borealis AG)
Propylene homopolymer (A2): "PP3155" (manufactured by ExxonMobil Chemical Corporation)

<Polyethylene-based Resin (C)>

Polyethylene-based resin (C1): "ASPUN 6850" (manufactured by The Dow Chemical Company)
Polyethylene-based resin (C2): "ASPUN 6834" (manufactured by The Dow Chemical Company)

The semi-crystallization time, MFR, and melting point (Tm-D) of the propylene homopolymers (A1) and (A2) and the polyethylene-based resins (C1) and (C2) measured by the aforementioned method are shown in Table 2.

TABLE 2

|  | Unit | Propylene homopolymer (A1) | Propylene homopolymer (A2) | Polyethylene-based resin (C1) | Polyethylene-based resin (C2) |
| --- | --- | --- | --- | --- | --- |
| Semi-crystallization time | sec | 0.05 | 0.05 | 0.01 or less | 0.01 or less |
| MFR | g/10 min | 27 | 35 | 30 | 17 |
| Melting point (Tm-D) | ° C. | 161 | 166 | 130 | 130 |

Example 1

(Preparation of First Component)

80% by mass of a propylene homopolymer (A1) and 20% by mass of a propylene-based polymer (B1) were kneaded to obtain a thermoplastic resin composition.

(Preparation of Second Component)

Only polyethylene-based resin (C2) was used as the second component.

(Production of Side-by-side type Fibers)

Molding of side-by-side type fibers was performed using a conjugated melt spinning machine bicomponent spinning apparatus having two extruders. The first component and the second component were melt-extruded at a resin temperature of 240° C. using separate single-screw extruders, and the molten resin was discharged from a side-by-side composite nozzle (having 6800 holes) having a nozzle diameter of 0.60 mm at a throughput of 220 kg/h per nozzle so that the mass ratio of the first component to the second component was 60:40 and spun to obtain side-by-side type fibers.

(Production of Spunbonded Nonwoven Fabric Composed of Side-by-Side Type Fibers)

The obtained side-by-side type fibers were sucked at a cabin pressure of 6,000 Pa while being cooled at a cooling temperature of 30° C. and collected on a moving net surface, and immediately thereafter, hot air at 135° C. was applied to the fibers at a pressure of 1,900 Pa using a hot air knife (manufactured by Reifenhäuser Reicofil). Subsequently, the fiber bundle collected on the net surface was partially thermally fused by heating the fiber bundle using three continuous ovens at temperatures of 120° C., 129° C., and 129° C., and was wound around a take-up roll at a line speed of 167 m/min.

Example 2

(Preparation of First Component)

80% by mass of a propylene homopolymer (A2) and 20% by mass of a propylene-based polymer (B2) were kneaded to obtain a thermoplastic resin composition.

(Preparation of Second Component)

Only polyethylene-based resin (C2) was used as the second component.

(Production of Side-by-Side Type Fibers)

Molding of side-by-side type fibers was performed using a conjugated melt spinning machine bicomponent spinning apparatus having two extruders. The first component and the second component were melt-extruded at a resin temperature of 240° C. using separate single-screw extruders, and the molten resin was discharged from a side-by-side composite nozzle (having 6800 holes) having a nozzle diameter of 0.60 mm at a throughput of 220 kg/h per nozzle so that the mass ratio of the first component to the second component was 50:50 and spun to obtain side-by-side type fibers.

(Production of Spunbonded Nonwoven Fabric Composed of Side-by-Side Type Fibers)

The obtained side-by-side type fibers were sucked at a cabin pressure of 6,000 Pa while being cooled at a cooling temperature of 30° C. and collected on a moving net surface. Subsequently, the fiber bundle collected on the net surface was partially thermally fused by heating the fiber bundle using three continuous ovens at temperatures of 125° C., 133° C., and 133° C., and was wound around a take-up roll at a line speed of 167 m/min.

Comparative Example 1

(Preparation of First Component)

80% by mass of a propylene homopolymer (A1) and 20% by mass of a propylene-based polymer (B1) were kneaded to obtain a thermoplastic resin composition.

(Preparation of Second Component)

Only polyethylene-based resin (C1) was used as the second component.

(Production of Side-by-Side Type Fibers)

The first component and the second component were melt-extruded at a resin temperature of 240° C. using separate single-screw extruders, and the molten resin was discharged from a side-by-side composite nozzle (having 6800 holes) having a nozzle diameter of 0.60 mm at a throughput of 265 kg/h per nozzle so that the mass ratio of the first component to the second component was 20:80 and spun to obtain side-by-side type fibers.

(Production of Spunbonded Nonwoven Fabric Composed of Side-by-Side Type Fibers)

The obtained side-by-side type fibers were sucked at a cabin pressure of 6,100 Pa while being cooled at a cooling temperature of 30° C. and collected on a moving net surface, and immediately thereafter, hot air at 135° C. was applied to the fibers at a pressure of 1,900 Pa using a hot air knife (manufactured by Reifenhäuser Reicofil). Subsequently, the fiber bundle collected on the net surface was partially thermally fused by heating the fiber bundle using three continuous ovens at temperatures of 120° C., 128° C., and 128° C., and was wound around a take-up roll at a line speed of 215 m/min.

Comparative Example 2

(Preparation of First Component)

Only propylene homopolymer (A2) was used as the first component.

(Preparation of Second Component)

Only polyethylene-based resin (C2) was used as the second component.

(Production of Side-by-side type Fibers)

The first component and the second component were melt-extruded at a resin temperature of 240° C. using separate single-screw extruders, and the molten resin was discharged from a side-by-side composite nozzle (having 6800 holes) having a nozzle diameter of 0.60 mm at a throughput of 220 kg/h per nozzle so that the mass ratio of the first component to the second component was 50:50 and spun to obtain side-by-side type fibers.
(Production of Spunbonded Nonwoven Fabric Composed of Side-by-Side Type Fibers)

The obtained side-by-side type fibers were sucked at a cabin pressure of 3,400 Pa while being cooled at a cooling temperature of 30° C. and collected on a moving net surface. Subsequently, the fiber bundle collected on the net surface was partially thermally fused by heating the fiber bundle using three continuous ovens at temperatures of 125° C., 133° C., and 133° C., and was wound around a take-up roll at a line speed of 167 m/min.

[Measurement of Basis Weight]

A mass of 20 cm×20 cm of the obtained nonwoven fabric was measured to measure a basis weight (gsm).

[Measurement of Fineness (Fiber Diameter)]

Fibers in the nonwoven fabric were observed with a polarizing microscope, an average value (d) of fiber diameter of randomly selected 100 fibers was measured, and fineness of the nonwoven fabric sample was calculated from a density of the resin ($\rho$=900,000 g/m$^3$) according to the following expression. Fineness (denier)=$\rho \times \pi \times (d/2)^2 \times 9{,}000$

[Handle-O-Meter Test]

A specimen having a size of 200 mm in length and 200 mm in width was fabricated from the obtained nonwoven fabric. The specimen was set on a slit having a width of ¼ inch such that it was at an angle of 90° to the slit, and the position of 67 mm (⅓ of the specimen width) from the side of the specimen was indented in a proportion of 8 mm by a blade of a penetrator. A resistance value at this time was measured to evaluate softness of the specimen. The characteristic feature of this measurement method resides in the matter that the specimen slightly slips on a test bench, and a force in which a frictional force generated and a resistance force (softness) at the indentation time are combined together is measured. It is meant that as the value of resistance value obtained by the measurement is small, the flexibility of the nonwoven fabric is favorable.

[Measurement of Texture Uniformity]

16 sheets of specimens of 74 mm×53 mm were prepared from the obtained nonwoven fabric. Next, an image converted into digital data was obtained using a scanner in a state in which a black image sheet was superimposed on each specimen. The obtained image data was each converted into a gray scale (the degree of black and white was divided into 255 levels, and the larger the value, the whiter the color), and the average value of the gray scale and the standard deviation of the gray scale of 16 specimens were determined from the histogram.

An index indicating the texture uniformity of the nonwoven fabric was calculated from the average value and the standard deviation of the gray scale using the following formula. The smaller this value is, the more excellent the texture uniformity of the nonwoven fabric is.

(texture uniformity of nonwoven fabric)=(average value of gray scale)/(standard deviation of gray scale)

[Measurement of Number of Pills]

A specimen of 210 mm×297 mm was prepared from the obtained nonwoven fabric. Next, an image converted into digital data was obtained using a scanner in a state in which a black image sheet was superimposed on each specimen. The obtained image data was gray-scaled in an arbitrary region. White portions having areas of 4 to 36 mm$^2$ in the gray-scaled image were counted as pills, and the counted number was defined as the number of pills.

[Measurement of Bulkiness]

A specimen having a size of 50 mm in length and 50 mm in width was sampled from the obtained nonwoven fabric. 10 sheets of the specimens were stacked, 1.9 g of a metal plate was placed on the stacked specimens, and thicknesses of the stacked specimens were measured. The higher the numerical value of the thickness, the bulkier the nonwoven fabric.

[Presence or Absence of Crimping of Fibers Constituting Nnonwoven Fabric]

The obtained nonwoven fabric was visually or microscopically observed to confirm the presence or absence of crimping of the fibers constituting the nonwoven fabric. At this time, "A" indicates that crimping was confirmed, and "B" indicates that crimping was not confirmed.

TABLE 3

| | | Unit | Example 1 | Comparative Example 1 | Example 2 | Comparative Example 2 |
|---|---|---|---|---|---|---|
| First component | Propylene homopolymer (A1) | % by mass | 80 | 80 | 0 | 0 |
| | Propylene homopolymer (A2) | % by mass | 0 | 0 | 80 | 100 |
| | Propylene-based polymer (B1) | % by mass | 20 | 20 | 0 | 0 |
| | Propylene-based polymer (B2) | % by mass | 0 | 0 | 20 | 0 |
| | Semi-crystallization time | sec | 0.09 | 0.09 | 0.09 | 0.05 |
| | MFR | g/10 min | 31 | 31 | 73 | 35 |
| | Melting point (Tm-D) | ° C. | 163 | 163 | 163 | 166 |
| Second component | Polyethylene-based resin (C1) | % by mass | 0 | 100 | 0 | 0 |
| | Polyethylene-based resin (C2) | % by mass | 100 | 0 | 100 | 100 |
| | Semi-crystallization time | sec | 0.01 or less | 0.01 or less | 0.01 or less | 0.01 or less |
| | MFR | g/10 min | 17 | 30 | 17 | 17 |
| | Melting point (Tm-D) | ° C. | 130 | 130 | 130 | 130 |
| (First component/Second component) mass ratio | | — | 60/40 | 20/80 | 50/50 | 50/50 |
| Ratio of (B) to the total of (A), (B) and (C) | | % | 12 | 4 | 10 | 0 |
| Resin temperature | | ° C. | 240 | 240 | 240 | 240 |
| Single hole throughput | | g/min/hole | 0.5 | 0.6 | 0.6 | 0.6 |
| Throughput per nozzle | | kg/h | 220 | 265 | 220 | 220 |
| Cabin pressure | | Pa | 6000 | 6100 | 6000 | 3400 |
| Hot air knife temperature | | ° C. | 135 | 135 | — | — |
| Hot air knife pressure | | Pa | 1900 | 1900 | — | — |
| Hot air oven temperature | | ° C. | 120 | 120 | 125 | 125 |
| | | ° C. | 129 | 128 | 133 | 133 |
| | | ° C. | 129 | 128 | 133 | 133 |

TABLE 3-continued

|  |  | Unit | Example 1 | Comparative Example 1 | Example 2 | Comparative Example 2 |
|---|---|---|---|---|---|---|
| Line speed |  | m/min | 167 | 215 | 167 | 167 |
| Basis weight |  | gsm | 20 | 20 | 20 | 20 |
| Fineness (fiber diameter) |  | μm | 14.0 | 15.8 | 15.8 | 17.7 |
|  |  | denier | 1.2 | 1.6 | 1.6 | 2.0 |
| Handle-O-Meter | MD | mN | 231 | 288 | 213 | 431 |
|  | CD | mN | 115 | 145 | 135 | 262 |
| Texture uniformity |  |  | 2.3 | 2.0 | 2.4 | 2.4 |
| Number of pills |  |  | 16 | 58 | 5 | 5 |
| Bulkiness |  | μm | 614 | 1037 | 580 | 420 |
| Presence or absence of crimping of fibers constituting non woven fabric |  | — | A | A | A | B |

According to the present invention, it is possible to provide a nonwoven fabric which is bulky and excellent in texture uniformity. Further, it can be seen that the nonwoven fabric provided by the present invention is also excellent in flexibility.

The invention claimed is:

1. A nonwoven fabric comprising a conjugated fiber comprising from 40% by mass to 80% by mass or less of a propylene homopolymer (A) having a melting point (Tm-D) measured by a differential scanning calorimeter (DSC) of higher than 120° C., from 4% by mass to 40% by mass of a polypropylene-based resin (B) having a melting point (Tm-D) measured by a differential scanning calorimeter (DSC) of 120° C. or lower, and from 10% by mass to 55% by mass of a polyethylene-based resin (C), wherein the nonwoven fabric has a texture uniformity of from 2.1 to 3.0 and a bulkiness of at least 450 μm,
wherein the conjugated fiber is a crimped fiber.

2. The nonwoven fabric of claim 1, wherein the number of pills is 30 or less per 210 mm×297 mm.

3. The nonwoven fabric of claim 1, wherein the conjugated fiber is at least one selected from the group consisting of a side-by-side fiber and a core-sheath fiber.

4. The nonwoven fabric of claim 1, wherein only one component of the conjugated fiber comprises the polypropylene-based resin (B), and only the other component comprises the polyethylene-based resin (C).

5. The nonwoven fabric of claim 1, wherein the conjugated fiber has a fineness of 1.8 denier or less.

6. The nonwoven fabric of claim 1, wherein the propylene homopolymer (A) has a melt flow rate (MFR) at 230° C. of from 5 g/10 min to 100 g/10 min.

7. The nonwoven fabric of claim 1, wherein the polypropylene-based resin (B) has a melt flow rate (MFR) at 230° C. of from 5 g/10 min to 5,000 g/10 min.

8. The nonwoven fabric of claim 1, wherein the polypropylene-based resin (B) has a melting endotherm (ΔH-D) measured by a differential scanning calorimeter (DSC) of from 0 J/g to 80 J/g.

9. The nonwoven fabric of claim 1, wherein the polypropylene-based resin (B) has a molecular weight distribution (Mw/Mn) of from 1.5 to 3.5.

10. The nonwoven fabric of claim 1, wherein the polypropylene-based resin (B) is a propylene homopolymer.

11. The nonwoven fabric of claim 1, wherein the polyethylene-based resin (C) has a melting point (Tm-D) measured by a differential scanning calorimeter (DSC) of 140° C. or lower.

12. The nonwoven fabric of claim 1, wherein the polyethylene-based resin (C) has a melt flow rate (MFR) at 190° C. of from 10 g/10 min 50 g/10 min.

13. A method for producing a nonwoven fabric, the method comprising:
melt-bonding a conjugated fiber by hot air,
wherein the conjugated fiber comprises from 40% by mass to 80% by mass of a propylene homopolymer (A) having a melting point (Tm-D) measured by a differential scanning calorimeter (DSC) of higher than 120° C., from 4% by mass to 40% by mass of a polypropylene-based resin (B) having a melting point (Tm-D) measured by a differential scanning calorimeter (DSC) of 120° C. or lower, and from 10% by mass to 55% by mass of a polyethylene-based resin (C).

14. The method for producing a nonwoven fabric of claim 13, wherein the melt-bonding the conjugated fiber by hot air comprises heating the conjugated fiber at a temperature of from 100 to 140° C. using a hot air oven to melt-bond the conjugated fibers to each other.

15. The method of claim 13, wherein the melt-bonding the conjugated fiber by hot air comprises:
(i) applying hot air having a temperature of from 120 to 150° C. at a wind pressure of from 1,000 to 2,500 Pa to the conjugated fiber using a hot air knife; and
(ii) heating the conjugated fiber at a temperature of from 100 to 140° C. using a hot air oven to melt-bond the conjugated fibers to each other, in this order.

* * * * *